United States Patent
Lindström et al.

(10) Patent No.: US 10,619,730 B2
(45) Date of Patent: Apr. 14, 2020

(54) METHOD FOR GEAR SHIFTING IN A HYBRID VEHICLE

(71) Applicant: Scania CV AB, Södertälje (SE)

(72) Inventors: Johan Lindström, Nyköping (SE); Mathias Björkman, Tullinge (SE); Mikael Bergquist, Huddinge (SE); Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 104 days.

(21) Appl. No.: 15/735,072

(22) PCT Filed: Jun. 15, 2016

(86) PCT No.: PCT/SE2016/050580
§ 371 (c)(1),
(2) Date: Dec. 8, 2017

(87) PCT Pub. No.: WO2016/204679
PCT Pub. Date: Dec. 22, 2016

(65) Prior Publication Data
US 2018/0320783 A1 Nov. 8, 2018

(30) Foreign Application Priority Data

Jun. 17, 2015 (SE) ........................................ 1550843

(51) Int. Cl.
*F16H 61/04* (2006.01)
*B60K 1/02* (2006.01)
(Continued)

(52) U.S. Cl.
CPC ........... *F16H 61/0403* (2013.01); *B60K 1/02* (2013.01); *B60K 6/365* (2013.01); *B60K 6/387* (2013.01);
(Continued)

(58) Field of Classification Search
CPC .................................................. F16H 61/0403
See application file for complete search history.

(56) References Cited

U.S. PATENT DOCUMENTS

| | | | |
|---|---|---|---|
| 6,843,749 B2 * | 1/2005 | Kelledes | B60K 1/00 180/244 |
| 6,886,648 B1 | 5/2005 | Hata et al. | |

(Continued)

FOREIGN PATENT DOCUMENTS

| | | |
|---|---|---|
| DE | 102007004458 A1 | 7/2008 |
| DE | 102013207856 A1 | 11/2013 |

(Continued)

OTHER PUBLICATIONS

International Search Report for PCT/SE2016/050580 dated Sep. 1, 2016.

(Continued)

*Primary Examiner* — Bao Long T Nguyen
*Assistant Examiner* — Michael A Berns
(74) *Attorney, Agent, or Firm* — Moore & Van Allen PLLC; W. Kevin Ransom

(57) ABSTRACT

A method for obtaining gear shifting of a vehicle, where the vehicle has a planetary gearing in the drive train, a combustion engine with an output shaft connected to a rotor of a second electric machine and to a first component of the planetary gearing, a first electric machine with a rotor connected to a third component of the planetary gearing and an input shaft of a gearbox connected to a second component of the planetary gearing. The method is started with the components of the planetary gearing interlocked by a locking means, in which they are released during the gear shifting and interlocked again after the gear shifting has been carried out.

11 Claims, 9 Drawing Sheets

(51) Int. Cl.
*B60K 6/365* (2007.10)
*B60K 6/387* (2007.10)
*B60K 6/40* (2007.10)
*B60K 6/48* (2007.10)
*B60K 6/547* (2007.10)
*B60W 30/18* (2012.01)
*F16H 59/42* (2006.01)
*B60W 10/02* (2006.01)
*B60W 10/06* (2006.01)
*B60W 10/08* (2006.01)
*F16H 59/14* (2006.01)
*B60W 20/00* (2016.01)
*B60W 20/30* (2016.01)

(52) U.S. Cl.
CPC ............... *B60K 6/40* (2013.01); *B60K 6/48* (2013.01); *B60K 6/547* (2013.01); *B60W 30/18* (2013.01); *F16H 59/42* (2013.01); *B60W 10/02* (2013.01); *B60W 10/06* (2013.01); *B60W 10/08* (2013.01); *B60W 20/00* (2013.01); *B60W 20/30* (2013.01); *F16H 2059/147* (2013.01); *F16H 2061/0422* (2013.01)

(56) References Cited

U.S. PATENT DOCUMENTS

| | | | |
|---|---|---|---|
| 8,147,366 B2* | 4/2012 | Kawasaki | B60K 1/02 180/65.265 |
| 8,241,174 B2 | 8/2012 | Wallner et al. | |
| 8,715,126 B2* | 5/2014 | Engstrom | B60K 6/48 475/149 |
| 9,770,969 B2 | 9/2017 | Bjorkman et al. | |
| 10,046,756 B2* | 8/2018 | Pettersson | B60K 6/365 |
| 10,279,798 B2* | 5/2019 | Kato | B60K 6/365 |
| 10,442,282 B2* | 10/2019 | Shinohara | B60L 15/2009 |
| 2002/0045507 A1 | 4/2002 | Bowen | |
| 2002/0189397 A1 | 12/2002 | Sakamoto et al. | |
| 2009/0250278 A1 | 10/2009 | Kawasaki et al. | |
| 2010/0006357 A1 | 1/2010 | Oba et al. | |
| 2013/0316865 A1 | 11/2013 | Engstroem et al. | |
| 2017/0349038 A1* | 12/2017 | Shinohara | B60K 1/02 |
| 2018/0326971 A1* | 11/2018 | Lindstrom | B60W 30/18 |

FOREIGN PATENT DOCUMENTS

| | | |
|---|---|---|
| EP | 1319546 A1 | 6/2003 |
| EP | 2060429 A1 | 5/2009 |
| SE | 536329 C2 | 8/2013 |
| WO | 2014158076 A1 | 10/2014 |

OTHER PUBLICATIONS

Written Opinion of the International Searching Authority for PCT/SE2016/050580 dated Sep. 1, 2016.
Supplementary European Search Report for Application No. EP16812044 dated Dec. 11, 2018.
International Preliminary Report on Patentability for International Patent Application No. PCT/SE2016/050580 dated Dec. 19, 2017.

* cited by examiner

METHOD FOR GEAR SHIFTING IN A HYBRID VEHICLE

CROSS-REFERENCE TO RELATED APPLICATION(S)

This application is a national stage application (filed under 35 § U.S.C. 371) of PCT/SE2016/050580, filed Jun. 15, 2016 of the same title, which, in turn claims priority to Swedish Application No. 1550843-5, filed Jun. 17, 2015 of the same title; the contents of each of which are hereby incorporated by reference.

FIELD OF THE INVENTION

The present invention relates to a method for controlling a vehicle, and more particularly, to a method for controlling gear shifting in a vehicle. The invention is especially but not exclusively directed to such a method carried out for motor vehicles in the form of wheeled utility motor vehicles, especially heavy such vehicles, such as trucks and buses.

BACKGROUND OF THE INVENTION

A drive system of the type to which the method according to the present invention is directed is known through for example EP 1 319 546 and SE 536 329. Although a number of advantageous methods for controlling a vehicle having a drive system of the type disclosed in SE 536 329 are known, there is of course an ongoing attempt to improve methods to control such vehicles, especially in certain situations.

SUMMARY OF THE INVENTION

The invention relates to a method carried out for a hybrid vehicle, which is generally speaking a vehicle which may be driven by a primary engine, here a combustion engine, and a secondary engine, here said first electric machine. The vehicle is suitably provided with means for storing electric energy, such as electric batteries or a capacitor for storing electric energy, and equipment for regulating the flow of electric energy between said means and the electric machine. The electric machine may then through exchange of electric energy with said means alternatively operate as motor and generator depending upon the state of operation of the vehicle. When braking the vehicle the electric machine generates electric energy which may be stored, and the electric energy stored may later be utilized for example the propulsion of the vehicle. By using a planetary gearing to interconnect the output shaft of the combustion engine, the rotor of the electric machine and the input shaft of the gearbox a number of advantages with respect to a conventional clutch mechanism may be obtained.

A possibility to an improved behavior in a number of operation situations is obtained by providing such a vehicle with a power assembly configuration also having a second electric machine with respect to vehicles with drive system without such a design of the power assembly configuration. Such an operation situation is when the vehicle is driven with said first locking means in the locking position and a gear shifting is to be carried out.

An example of a power assembly configuration that can used with the disclosed method is a power assembly configured to provide power for the propulsion of the vehicle, a planetary gearing comprising three components in the form of a sun gear, a ring gear and a planetary gears carrier, an input shaft of the planetary gearing being connected to a first of said components of the planetary gearing so that a rotation of this input shaft results in a rotation of this component, an output shaft of the planetary gearing constituting an input shaft of a gearbox for transmitting a torque for the propulsion of the vehicle being connected to a second of said components of the planetary gearing so that a rotation of this output shaft results in a rotation of this component, said power assembly configuration comprises a first electric machine with a stator and a rotor connected to a third of said components of the planetary gearing so that rotation of the rotor of the first electric machine results in a rotation of this component and a combustion engine with an output shaft connected to said input shaft of the planetary gearing, said drive system further comprising a first locking means transferable between a locking position in which two of said components of the planetary gearing are interlocked so that said three components rotate with the same rotation speed and a releasing position in which said components are allowed to rotate with different rotation speeds, said power assembly configuration comprises a second electric machine with a stator and a rotor connected to the input shaft of the planetary gearing, wherein said computer program code comprising computer instructions to cause one or more computer processors to perform the following operations for carrying out shifting from a present gear to a new gear in the gearbox when driving the vehicle with said first locking means in said locking position.

An energy and time saving shifting may be obtained by carrying out the method of:
a) controlling the power assembly configuration to decrease the torque applied on said input shaft of the gearbox to decrease towards zero and to obtain torque balance in the planetary gearing;
b) upon obtaining torque balance in the planetary gearing, transferring said first locking means to said releasing position and starting to control members of the power assembly configuration acting upon said first component towards a target rotation speed of said new gear to be shifted to;
c) disengaging said present gear of the gearbox when the torque on said input shaft of the gearbox reaches zero and starting to control said power assembly configuration to apply a torque to said input shaft being negative when said new gear is higher than said present gear and positive when said new gear is lower than said present gear for controlling the rotation speed of said input shaft of the gearbox towards said target rotation speed of said new gear;
d) when the rotation speed of said input shaft of the gearbox reaches said target rotation speed, engaging said new gear, controlling the power assembly configuration to increase the torque on said input shaft of the gearbox while maintaining torque balance in the planetary gearing and continuing to control members of the power assembly configuration acting upon said first component towards said target rotation speed; and
e) upon obtaining said target rotation speed of the input shaft of the planetary gearing transferring said first locking means to the locking position and continuing to control the power assembly configuration to increase the torque applied on said input shaft of the gearbox while controlling the different members of the power assembly configuration to deliver torques of desired values.

The gear shifting procedure will also be robust with respect to torque deviations or variations in the combustion engine, since this is disconnected thanks to the releasing of the planetary gearing locking means. The presence of the second electric machine provides the possibility to use this to brake the combustion engine when controlling the rotation speed thereof towards a target rotation speed of a new gear to be shifted to, which means that a use of for instance an exhaust gas brake may be avoided and instead the braking energy may be fed to means for storing electric energy. Furthermore, the presence of two electric machines in said power assembly configuration makes it possibly to select the level of electric energy fed to or drained from such means for storing electric energy.

According to an embodiment of the invention said control starting in step b) and continued to step d) of members of the power assembly configuration acting upon said first component towards said target rotation speed is carried out by controlling the combustion engine to change rotation speed. The transfer of said first locking means and by that the planetary gearing to the releasing position during the gear shifting procedure prolongs the time which may be spent for reaching said target rotation speed by the output shaft of the combustion engine.

According to another embodiment of the invention the second electric machine is controlled to assist the combustion engine to change the rotation speed towards said target rotation speed by applying a braking force on the output shaft of the combustion engine when said target rotation speed is lower than the actual rotation speed of the output shaft of the combustion engine. As stated above, this makes it possible to avoid to use for example an exhaust gas brake for assisting in braking the combustion engine and the energy generated during the braking may instead be transferred from said second electric machine to means for storing electric energy.

According to another embodiment of the invention the control of the power assembly configuration for controlling the rotation speed of said input shaft of the gearbox towards said target rotation speed of said new gear in step c) is carried out by carrying out a rotation speed control of the combustion engine and the first electric machine.

According to another embodiment of the invention the combustion engine, the first electric machine and the second electric machine are controlled in step e) to deliver torques of desired values.

According to another embodiment of the invention it is a vehicle having a power assembly configuration comprising at least one means for storing electric energy, such as at least one electric battery, for exchange of electric energy with said first and second electric machines that is controlled.

According to another embodiment of the invention the distribution of torque to be delivered by the combustion engine and the second electric machine is selected so that the combustion engine will deliver a positive torque during the entire gear shifting procedure and said torque distribution is selected for controlling delivering of electric power to said means for storing electric energy during the gear shifting. This makes it possible to maintain steady operation conditions such as turbo charge pressure and airflow through the combustion engine during the entire gear shifting procedure. This means that the response of the power assembly configuration will be very good after the new gear has been engaged and will enable a quicker torque ramp up without effecting the emissions of the combustion engine.

According to another embodiment of the invention the control is carried out of a vehicle having a said drive system which further comprises a second locking means transferable between a locking position in which the output shaft of the combustion engine is locked to the rotor of the second electric machine and said first component and a releasing position in which the output shaft of the combustion engine is released from the rotor of the second electric machine and said first component and allowed to rotate independently thereof. The presence of such a second locking means makes it possible to disconnect the combustion engine from the planetary gearing and the drive train of the vehicle and drive the vehicle purely electrically.

According to another embodiment of the invention the method is carried out on a vehicle having a said drive system with a sun gear of the planetary gearing as said first component and the ring gear as said third component. A compact structure easy to fit into spaces already existing for drive trains with clutch mechanisms instead of planetary gearing may be obtained by connecting the rotor of the first electric machine with the ring gear and the output shaft of the combustion engine with the sun gear. A gearbox for a hybrid vehicle may by this be made compact and not substantially more space demanding than a standard gearbox. This means that the weight increase normally caused by a hybrid construction may be considerably reduced.

Other advantageous features as well as advantages of the present invention appear from the description following below.

BRIEF DESCRIPTION OF THE DRAWINGS

With reference to the appended drawings, below follows a specific description of embodiments of the invention cited as examples. In the drawings.

DETAILED DESCRIPTION OF THE INVENTION

Figure 1:
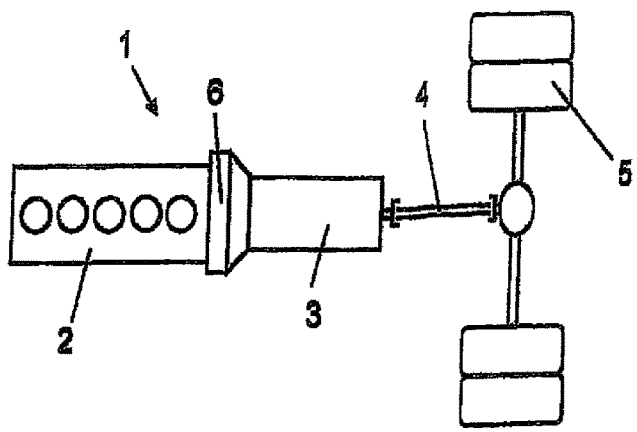
FIG. 1 illustrates very schematically a drive train of a vehicle which may be provided with a drive system for carrying out a method according to the invention.
Figure 2:
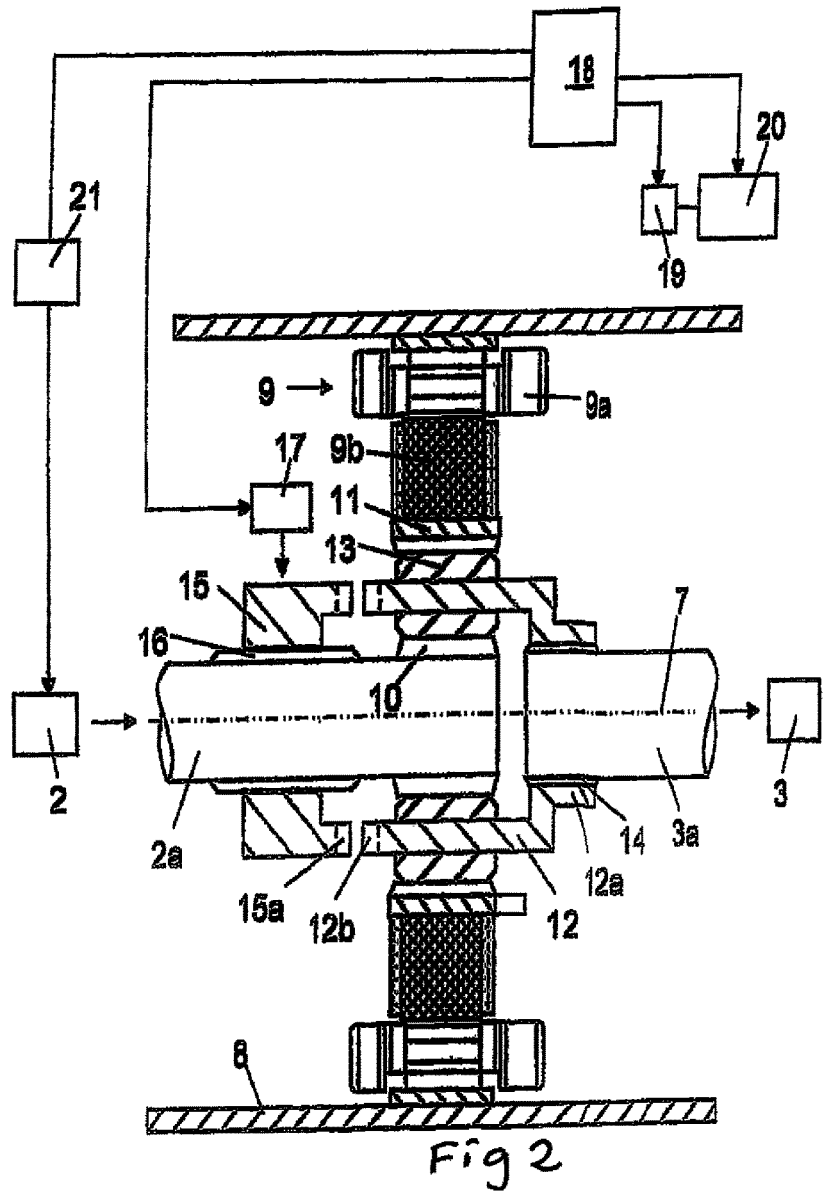
FIG. 2 is a more detailed but still simplified view of a part of said drive system.

FIG. 1 shows a drive train for a heavy vehicle 1. The drive train comprises a combustion engine 2, a gearbox 3 and a number of drive shafts 4 and drive wheels 5. The drive train has an intermediate portion 6 located between the combustion engine 2 and the gearbox 3. FIG. 2 shows a part of the components in said intermediate portion 6 more in detail, namely those which are also present in drive systems of the type defined in the introduction already known, such as through SE 536 329. The combustion engine 2 is provided with an output shaft 2a and the gearbox 3 with an input shaft 3a in the intermediate portion 6. The output shaft 2a of the combustion engine is arranged coaxially with respect to the input shaft 3a of the gearbox. The output shaft 2a of the combustion engine and the input shaft 3a of the gearbox rotate around a rotation axis 7 in common. The intermediate portion 6 comprises a housing 8 enclosing an electric machine 9 and a planetary gearing. The electric machine 9 comprises a stator 9a and a rotor 9b. The stator 9a comprises a stator core secured to the inner wall of the housing 8. The stator core comprises the windings of the stator. The first electric machine 9 is configured to under certain operation states utilize electric energy stored so as to supply driving force to the input shaft 3a of the gearbox and during other operation states utilize kinetic energy of the input shaft 3a of the gearbox to produce and store electric energy.

The planetary gearing is arranged substantially radially internally of the stator 9a and the rotor 9b of the electric machine. The planetary gearing comprises a sun gear 10, a ring gear 11 and a planetary gears carrier 12. The planetary gears carrier 12 carries a number of gears 13 arranged to rotate in a radial space between the sun gear 10 and the teeth of the ring gear 11. The sun gear 10 is here secured to a peripheral surface of the output shaft 2a of the combustion engine. The sun gear 10 and the output shaft 2a of the combustion engine rotate as a unit with a first number of revolutions $n_1$. The planetary gears carrier 12 comprises a securing portion 12a secured to a peripheral surface of the input shaft 3a of the gearbox by means of a splines joint 14. The planetary gears carrier 12 and the input shaft 3a of the gearbox may by means of this joint rotate as a unit with a second number of revolutions $n_2$. The ring gear 11 comprises an external peripheral surface onto which the rotor 9b is secured. The rotor 9b and the ring gear 11 form a rotatable unit rotating with a third number of revolutions $n_3$.

The drive system comprises further a first locking means by the fact that the output shaft 2a of the combustion engine is provided with a displaceable coupling member 15. The coupling member 15 is secured to the output shaft 2a of the combustion engine by means of a splines joint 16. The coupling member 15 is in this case secured against rotation on the output shaft 2a of the combustion engine and displaceable in an axial direction on this output shaft 2a. The coupling member 15 comprises a coupling portion 15a which is connected to a coupling portion 12b of the planetary gears carrier 12. A displacing member 17 schematically shown is arranged to displace the coupling member 15 between a first position in which the coupling portions 15a, 12b are not in mutual engagement corresponding to a releasing position of the first locking means and a second position in which the coupling portions 15a, 12b are in mutual engagement corresponding to a locking position of the first locking means. The output shaft 2a of the combustion engine and the input shaft 3a of the gearbox will in this locking position be interlocked and they and by that also the rotor of the electric machine will rotate with the same number of revolutions. This state may be called locked planet. The locking mechanism may also have any other construction, such as the one disclosed in the Swedish patent application 1250696-0. The locking means may also be formed by any suitable type of friction coupling or clutch.

An electronic control unit 18 is configured to control the displacing member 17. The control unit 18 is also configured to decide on which occasions the electric machine shall function as a motor and on which occasions it shall function as a generator. The control unit 18 may receive information about suitable operation parameters for deciding which function is to be chosen. The control unit 18 may be a computer with software for this task. The control unit 18 controls a regulating equipment 19 schematically indicated which regulates the flow of electric energy between a hybrid battery 20 and the stator windings 9a of the electric machine. When the electric machine 9 operates as motor electric energy stored in the hybrid battery 20 is supplied to the stator 9a. When the electric machine operates as generator electric energy is supplied to the hybrid battery 20 from the stator 9a. The hybrid battery 20 delivers and stores electric energy having a voltage in the order of 300-900 V. It is important that the electric machine 9 and the planetary gearing constitute a compact unit, since the intermediate portion 6 between the combustion engine 2 and the gearbox 3 in a vehicle is restricted. The components 10, 11, 12 of the planetary gearing are arranged substantially radially internally of the stator 9a of the electric machine. The rotor 9b of the electric machine, the ring gear 11 of the planetary gearing, the output shaft 2a of the combustion engine and the input shaft 3a of the gearbox are here arranged to rotate around a rotation axis 7 in common. Such a design means that the electric machine 9 and the planetary gearing require comparatively little space. The vehicle 1 is provided with an engine control function 21 through which the number of revolutions $n_1$ of the combustion engine 2 is controlled. The drive system may of course instead of being controlled by one single control unit 18 be controlled by several different control units.

Figure 3:
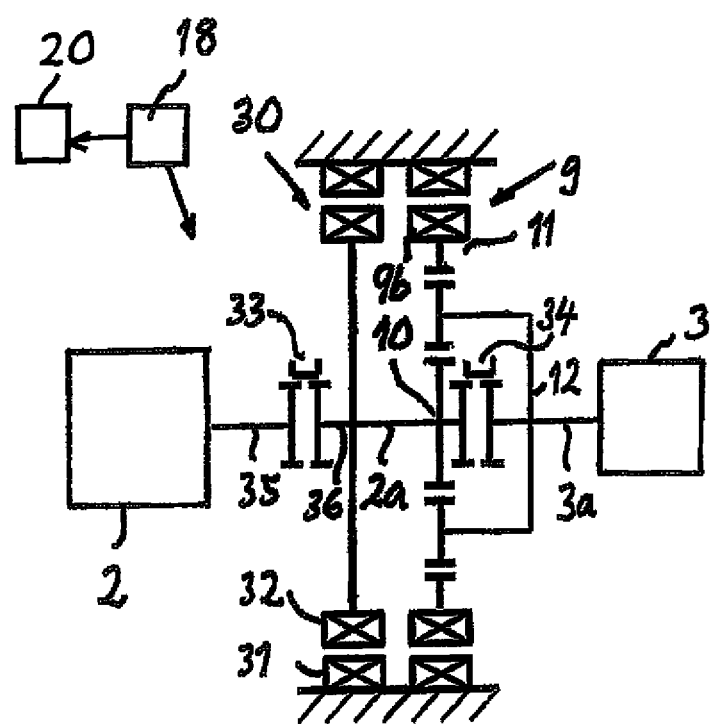
FIG. 3 is a simplified view illustrating the general construction of a drive system for carrying out a method according to the invention.

A drive system to which a method according to the invention may be carried out is shown in FIG. 3. This drive system differs from that shown in FIG. 2 by including a second electric machine 30. The second electric machine has a stator 31 with stator windings and a rotor 32 connected to the output shaft 2a of the combustion engine. A second locking means 33, which may have a similar design as the first locking means 34, which is more in detail shown in FIG. 2, is configured to in a releasing position separate a first part 35 of the output shaft of the combustion engine closest to the combustion engine from a second part 36 thereof connected to the sun gear 10 of the planetary gearing, so that the rotor 32 of the second electric machine and the sun gear 10 are allowed to rotate independently of the first part 35 of the output shaft of the combustion engine. The second locking means is transferable to a locking position in which both parts 35, 36 of the output shaft of the combustion engine are interlocked and by that said first part 35 is locked to the rotor of the second electric machine. The control unit 18 is configured to control supply of fuel to the combustion engine 2 and exchange of electric energy between the first electric machine 9, the second electric machine 30 and the means 20 for storing electric energy.

A method according to an embodiment of the invention for shifting from a present gear to a new higher gear, i.e. with a higher rotation speed of an output shaft of the gearbox for a certain rotation speed of the input shaft of the gearbox, in the gearbox while driving a vehicle having a drive system of the type shown in FIG. 3 with a positive torque in the drive train will now be described while making reference to FIG. 4. The times t for starting the different steps of the procedure are indicated by 1-5 and the following will be carried out at these times:

1. The power assembly configuration is controlled to decrease the torque T applied on the input shaft I of the gearbox to decrease towards zero and to obtain torque balance in the planetary gearing.
2. Upon obtaining torque balance in the planetary gearing the first locking means 34 is transferred to the releasing position, and a control of the combustion engine ICE (2) towards a target rotation speed of the new gear to be shifted to is started, in which the second electric machine EM2 (30) having the rotor connected to the output shaft of the combustion engine is used to brake the combustion engine towards said target rotation speed.
3. The present gear of the gearbox is disengaged when the torque on said input shaft I of the gearbox reaches zero, and a control of the combustion engine ICE, the second electric machine EM2 and the first electric machine EM1 to apply a negative torque to the input shaft and the output shaft of the planetary gearing is started for controlling the rotation speed of the input shaft of the gearbox towards said target rotation speed of the new gear.
4. When the rotation speed v of the input shaft I of the gearbox reaches said target rotation speed the new gear is engaged. The power assembly configuration is controlled to increase the torque T on the input shaft I of the gearbox while maintaining torque balance in the planetary gearing, and the output shaft of the combustion engine ICE connected to the sun gear is controlled towards said target rotation speed.
5. When said target rotation speed is obtained by the input shaft ICE+EM2 of the planetary gearing the first locking means 34 is transferred to the locking position, and the torques delivered by the combustion engine and the first electric machine EM1 are controlled to desired levels. The method is ended when reaching the time 6.

Figure 4:
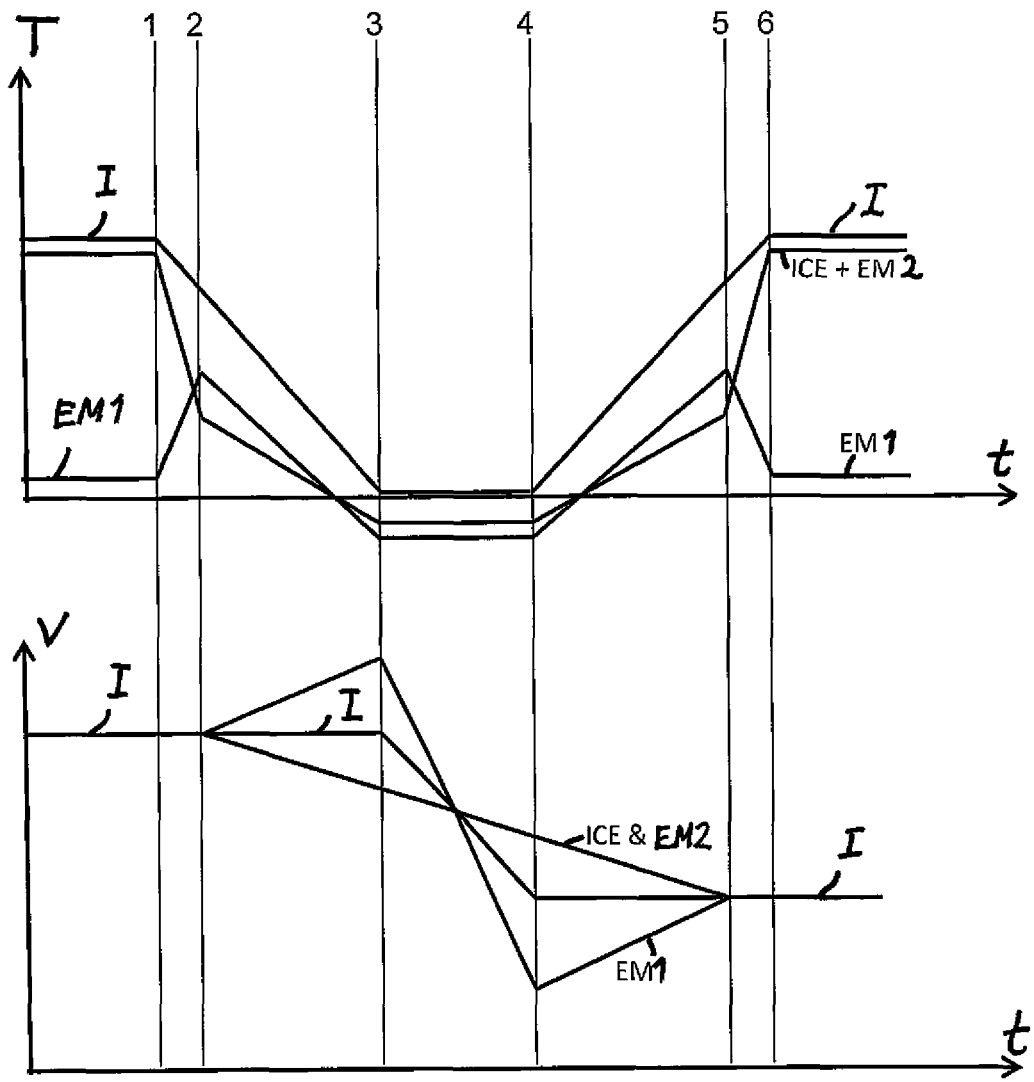
FIG. 4 shows graphs of the torque T and rotation speed v, respectively, versus time t of the input shaft of the gearbox I, the output shaft of the combustion engine with rotor of the second electric machine ICE+EM2 and the rotor of the first electric machine EM1 when carrying out a gear shifting procedure to a higher gear while driving the vehicle with positive torque in the drive train in a method according to an embodiment of the invention.
Figure 5:
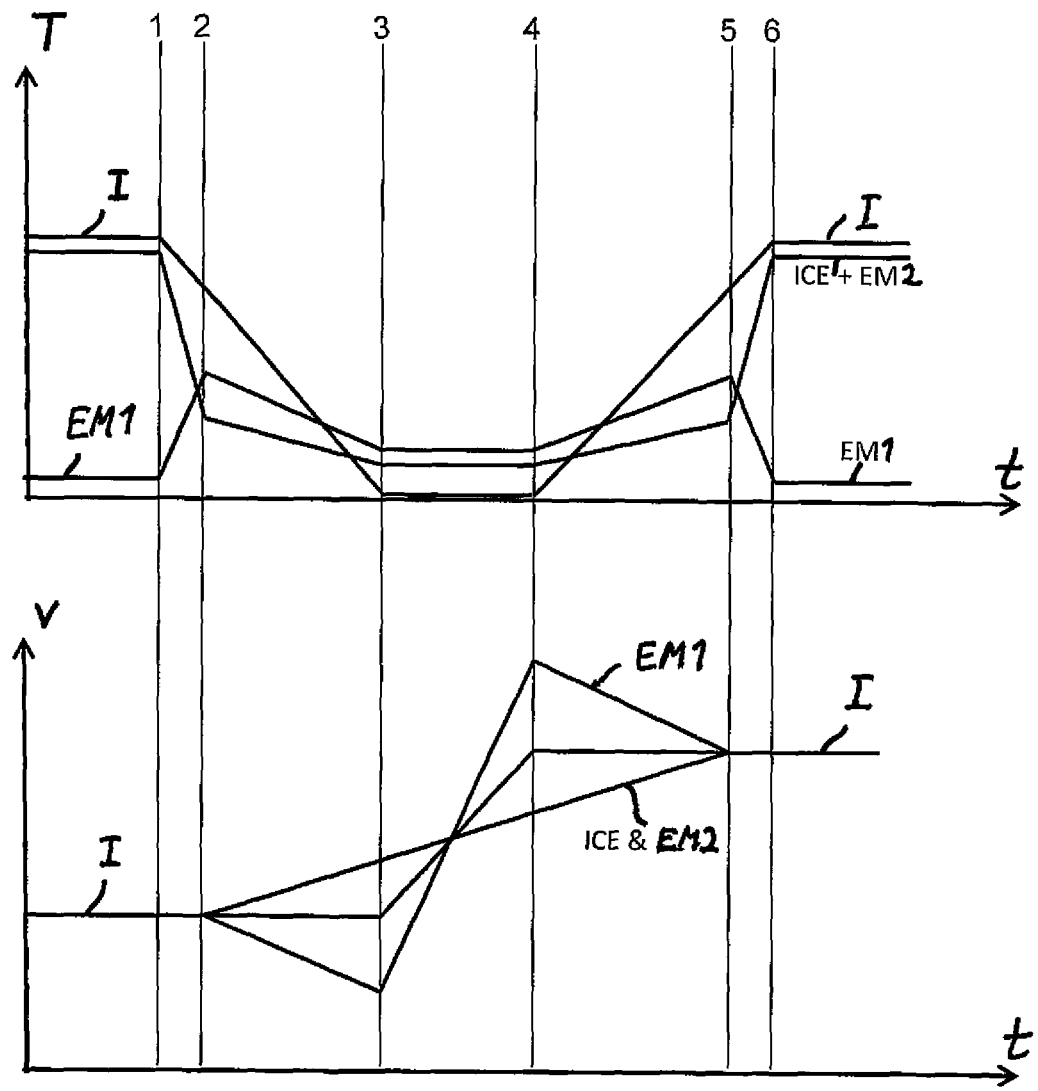
FIG. 5 shows graphs of the torque and rotation speed, respectively, versus time of the input shaft of the gearbox, the output shaft of the combustion engine with rotor of the second electric machine and the rotor of the first electric machine when carrying out a gear shifting procedure to a lower gear while driving the vehicle with positive torque in the drive train in a method according to an embodiment of the invention.
Figure 6:
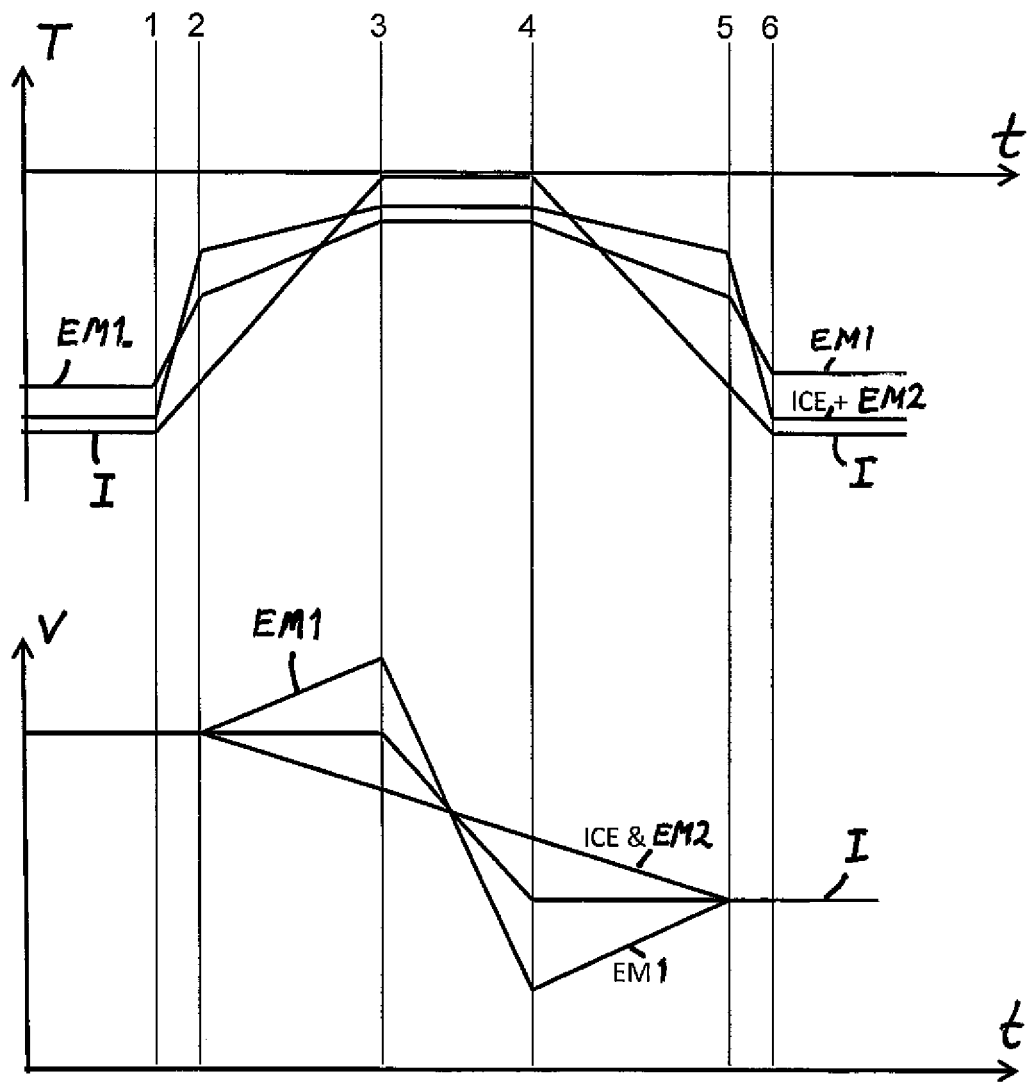
FIG. 6 shows graphs of the torque and rotation speed, respectively, versus time of the input shaft of the gearbox, the output shaft of the combustion engine with rotor of the second electric machine and the rotor of the first electric machine when carrying out a gear shifting procedure to a higher gear while braking the vehicle in a method according to an embodiment of the invention.
Figure 7:
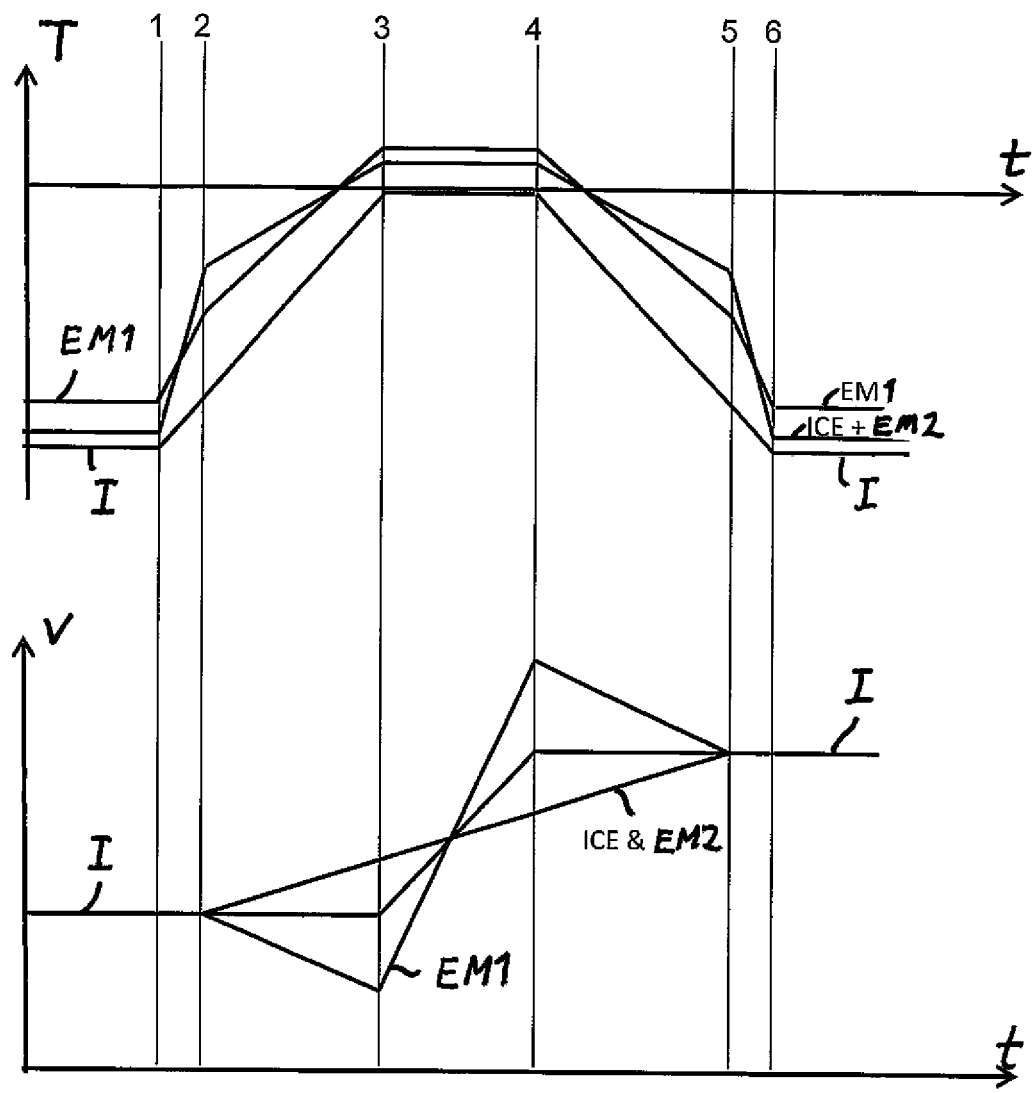
FIG. 7 shows graphs of the torque and rotation speed, respectively, versus time of the input shaft of the gearbox, the output shaft of the combustion engine with rotor of the second electric machine and the rotor of the first electric machine when carrying out a gear shifting procedure to a lower gear while braking the vehicle in a method according to an embodiment of the invention.

FIGS. 5, 6 and 7 illustrate the development of torques T and rotation speeds v when carrying out the method now disclosed for shifting to a lower gear while driving the vehicle with positive torque in the drive train, shifting to a higher gear while braking the vehicle and shifting to a lower gear while braking the vehicle, respectively. The main difference with respect to the method disclosed with reference to FIG. 4 is that when reaching the time 3 positive torques are applied through the combustion engine and the first electric machine EM1 for increasing the rotation speed of the input shaft of the gearbox when shifting to a lower gear.

Figure 8:
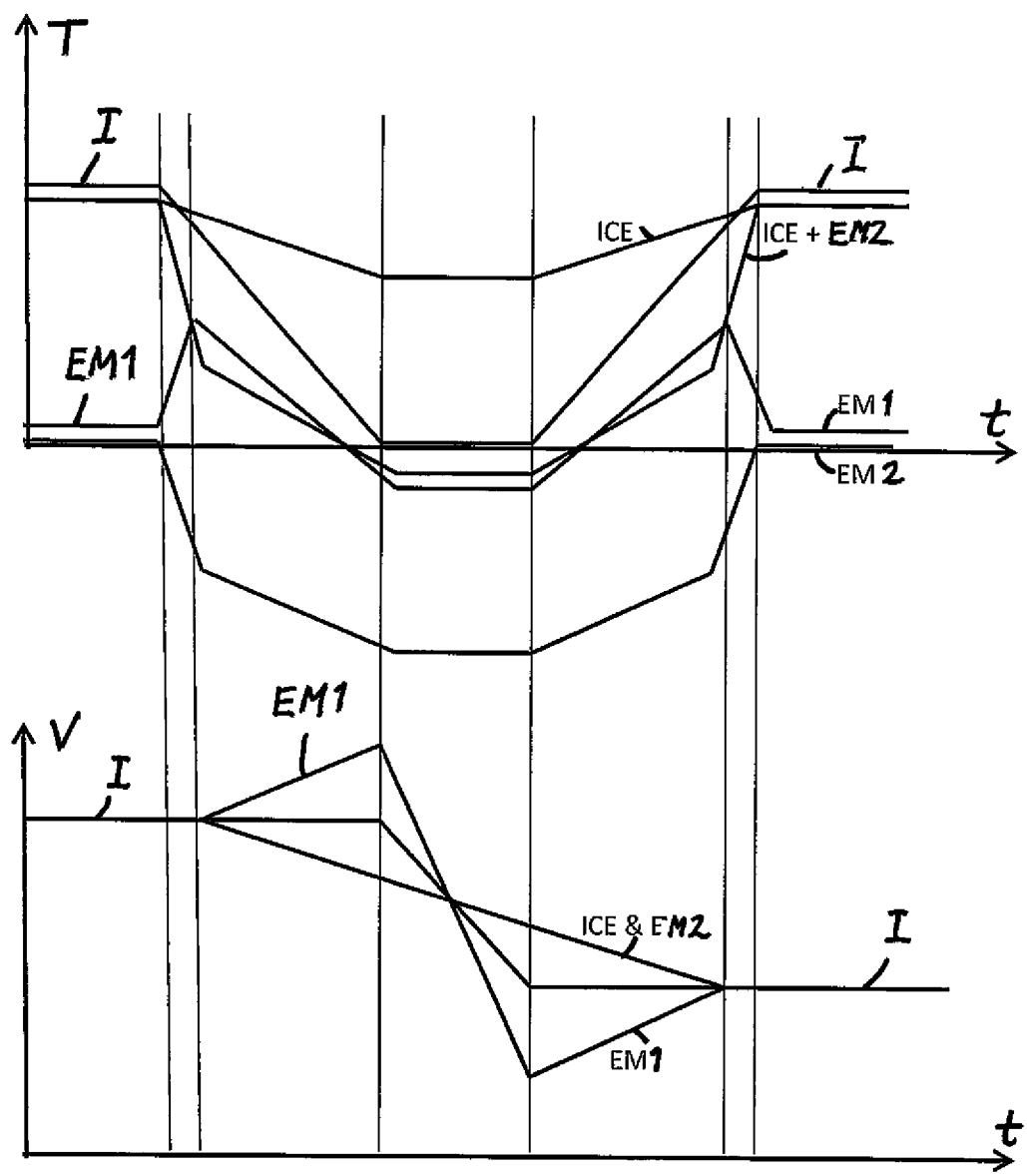
FIG. 8 shows graphs differing from those shown in FIG. 4 only by illustrating the torque of the combustion engine ICE and the second electric machine EM2 separately for illustrating the possible developments thereof when carrying out a gear shifting with a combustion engine delivering a positive torque during the entire gear shifting procedure.

FIG. 8 illustrates how the torque T to be delivered by the combustion engine ICE and the second electric machine EM2 while carrying out the method illustrated through FIG. 4 may be distributed for obtaining that the combustion engine delivers a positive substantial torque during the entire gear shifting procedure, which means that for example turbo charge pressure and airflow through the combustion engine may be maintained and a very good response after putting in the new gear is achieved. By selecting the torque distribution of the combustion engine and the second electric machine it will be possible to control feeding of power to means storing electric energy or electric appliances, such as servo-steering unit, pumps or air-conditions arrangement, of the vehicle during the gear shifting procedure.

Figure 9:
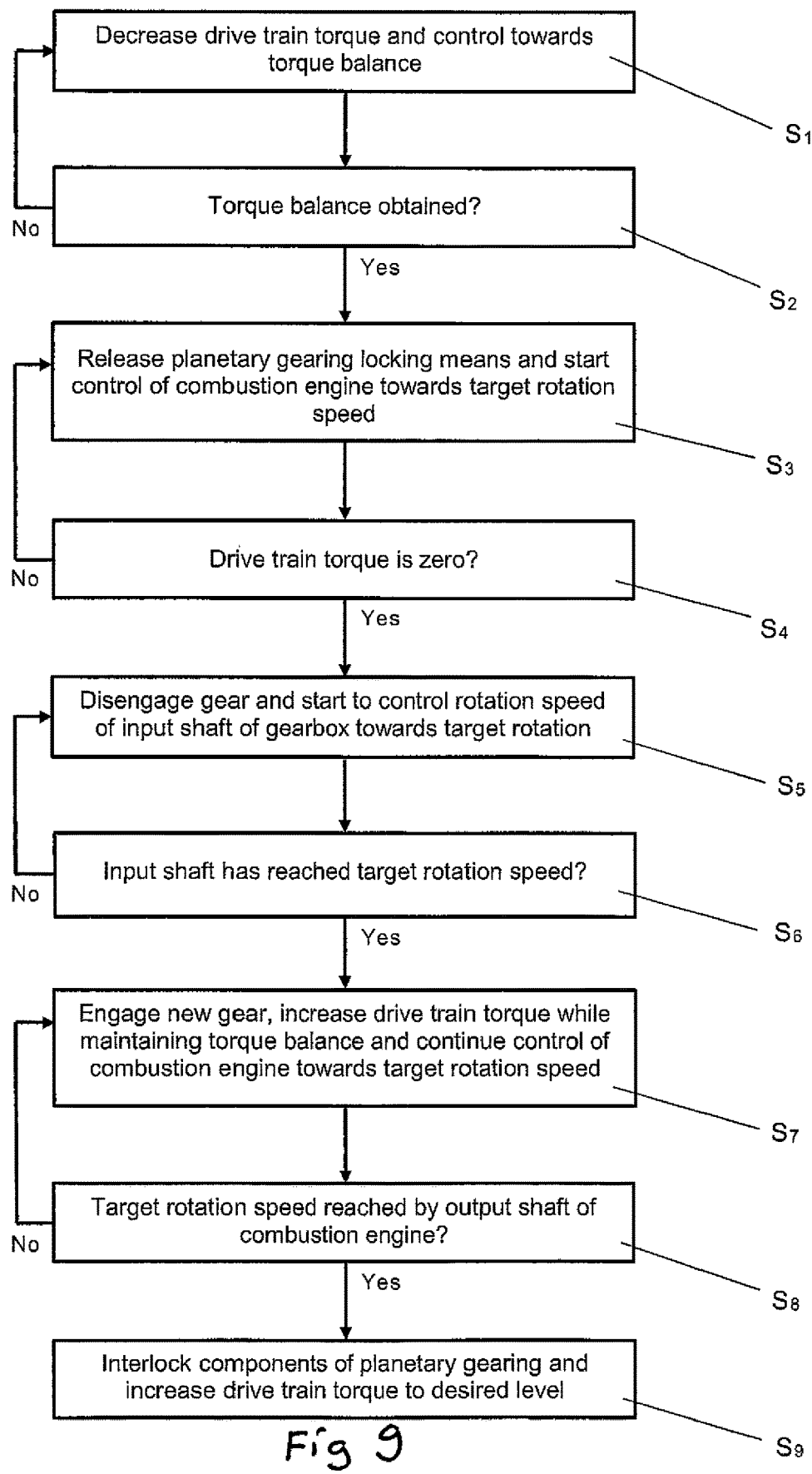
FIG. 9 is a flow chart illustrating the steps carried out in a method according to an embodiment of the invention.

FIG. 9 illustrates a flow chart of a method according to an embodiment of the present invention carried out for a vehicle with a drive system of the type shown in FIG. 3. It is assumed that the vehicle is driven with the first locking means 34 in the locking position. The method is started with the step $S_1$ of decreasing the drive train torque and controlling torques towards balance in the planetary gearing. In a subsequent step $S_2$ the question is asked whether torque balance is obtained. When the answer to this question is "yes" it is continued to step $S_3$ of releasing the planetary gearing locking means and starting to control the combustion engine towards a target rotation speed of the input shaft of the gearbox for the new gear to be shifted to. It is then in a step $S_4$ asked whether the drive train torque is zero, and if the answer to this question is "yes" it is proceeded to step $S_5$ for disengaging out the present gear and starting to control the rotation speed of the input shaft of the gearbox towards said target rotation speed. In a subsequent step $S_6$ it is asked whether the input shaft of the gearbox has reached target rotation speed, and if the answer to this question is "yes" the new gear is engaged in a step $S_7$, and the drive train torque is increased while maintaining torque balance and it is continued to control the combustion engine towards said target rotation speed. In a step $S_8$ it is asked whether the target rotation speed has been reached by the output shaft of the combustion engine, and when the answer to this question is "yes" the components of the planetary gearing are interlocked and the drive train torque is increased to a desired level, whereupon the gear shifting procedure is completed.

Figure 10:
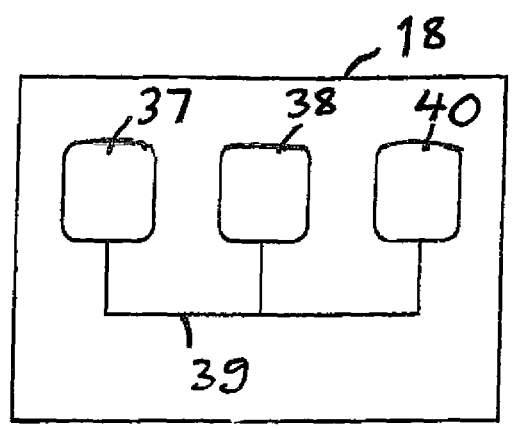
FIG. 10 is a schematic view illustrating an electronic control unit for implementing a method according to the invention.

Computer program code for implementing a method according to the invention is with advantage included in a computer program which can be read into the internal memory of a computer, e.g. the internal memory of an electronic control unit of a motor vehicle. Such a computer program is with advantage provided via a computer program product comprising a data storage medium which can be read by a computer and which has the computer program stored on it. Said data storage medium is for example an optical data storage medium in the form of a CD ROM disc, a DVD disc etc., a magnetic data storage medium in the form of a hard disc, a diskette, a cassette tape etc., or a flash memory or a memory of the ROM, PROM, EPROM or EEPROM type. FIG. 10 illustrates very schematically an electronic control unit 18 comprising an execution means 37, e.g. a central processor unit (CPU), for execution of computer software. The execution means 37 communicates with a memory 38, e.g. of the RAM type, via a data bus 39. The control unit 18 comprises also a non-transitory data storage medium 40, e.g. in the form of a flash memory or a memory of the ROM, PROM, EPROM or EEPROM type. The execution means 37 communicates with the data storage medium 40 via the data bus 39. A computer program comprising computer program code for implementing a method according to the invention, e.g. in accordance with the embodiment illustrated in FIG. 9 is stored on the data storage medium 40.

The invention is of course in no way restricted to the embodiments described above, since many possibilities for modifications thereof are likely to be obvious to one skilled in the art without having to deviate from the scope of invention defined in the appended claims.

The second electric machine may be connected to the output shaft of the combustion engine by other means than said second locking means and may also be directly connected to the output shaft of the combustion engine.

The method according to the invention may also be carried out in a vehicle having a drive system with a ring gear of the planetary gearing as said first component and the sun gear as said third component, which means that the rotor of the first electric machine would be connected to the sun gear of the planetary gearing and the rotor of the second electric machine and the combustion engine would be connected to the ring gear of the planetary gearing instead of to the sun gear. However, the output shaft of the planetary gearing for transmitting torque for the propulsion of the vehicle is preferably connected to the planetary gears carrier.

Torque balance in the planetary gearing is defined as a state when a torque acts on a ring gear of the planetary gearing, which corresponds to the product of the torque acting on the planetary gears carrier of the planetary gearing and the transmission ratio of the planetary gearing at the same time as a torque acts on the sun gear of the planetary gearing which corresponds to the product of the torque acting upon the planetary gears carrier and (1—the transmission ratio of the planetary gearing). At such a torque balance the planetary gearing locking means will not transfer any torque between the components of the planetary gearing.

The invention claimed is:

1. A method for controlling a vehicle with a drive system, where the drive system comprises a power assembly configuration configured to provide power for propulsion of the vehicle, a planetary gearing comprising three components in the form of a sun gear, a ring gear and a planetary gears carrier, an input shaft of the planetary gearing being connected to a first component of said three components of the planetary gearing so that a rotation of the input shaft of the planetary gearing results in a rotation of the first component, an output shaft of the planetary gearing constituting an input shaft of a gearbox for transmitting a torque for propulsion of the vehicle being connected to a second of said three components of the planetary gearing so that a rotation of the output shaft of the planetary gearing results in a rotation of the second component, said power assembly configuration comprises a first electric machine with a first electric machine stator and a first electric machine rotor connected to a third of said three components of the planetary gearing so that rotation of the rotor of the first electric machine results in a rotation of the third component and a combustion engine having an output shaft connected to said input shaft of the planetary gearing, said drive system further comprising a first locking means transferable between a locking position in which two of said three components of the planetary gearing are interlocked so that said three components of the planetary gearing rotate with the same rotation speed and a releasing position in which said two of said three components of the planetary gearing are allowed to rotate with different rotation speeds, said power assembly configuration further comprises a second electric machine with a second electric machine stator and a second electric machine rotor connected to the input shaft of the planetary gearing, wherein said method comprises the following steps for carrying out a gear shifting procedure from a present gear to a new gear in the gearbox when driving the vehicle with said first locking means in said locking position:

a) controlling the power assembly configuration to decrease the torque applied on said input shaft of the gearbox to decrease towards zero and to obtain torque balance in the planetary gearing;

b) upon obtaining torque balance in the planetary gearing, transferring said first locking means to said releasing position and starting to control members of the power assembly configuration acting upon said first component of said three components of the planetary gearing towards a target rotation speed of said new gear to be shifted to;

c) disengaging said present gear of the gearbox when the torque on said input shaft of the gearbox reaches zero and starting to control said power assembly configuration to apply a torque to said input shaft of the gearbox being negative when said new gear is higher than said present gear and positive when said new gear is lower than said present gear for controlling the rotation speed of said input shaft of the gearbox towards said target rotation speed of said new gear;

d) when the rotation speed of said input shaft of the gearbox reaches said target rotation speed, engaging said new gear, controlling the power assembly configuration to increase the torque on said input shaft of the gearbox while maintaining torque balance in the planetary gearing and continuing to control members of the power assembly configuration acting upon said first component of said three components of the planetary gearing towards said target rotation speed; and e) upon obtaining said target rotation speed of the input shaft of the planetary gearing transferring said first locking means to the locking position and continuing to control the power assembly configuration to increase the torque applied on said input shaft of the gearbox while controlling the different members of the power assembly configuration to deliver torques of desired values.

2. The method according to claim 1, wherein said control starting in step b) and continued to step d) of members of the power assembly configuration acting upon said first component of said three components of the planetary gearing towards said target rotation speed is carried out by controlling the combustion engine to change a rotation speed.

3. A method according to claim 2, wherein the second electric machine is controlled to assist the combustion engine to change the rotation speed towards said target rotation speed by applying a braking force on the output shaft of the combustion engine when said target rotation speed is lower than an actual rotation speed on the output shaft of the combustion engine.

4. A method according to claim 1, wherein the control of the power assembly configuration for controlling the rotation speed of said input shaft of the gearbox towards said target rotation speed of said new gear in step c) is carried out by carrying out a rotation speed control of the combustion engine and the first electric machine.

5. A method according to claim 1, wherein the combustion engine, the first electric machine, and the second electric machine are controlled in step e) to deliver torques of desired values.

6. A method according to claim 1, wherein the vehicle has at least one means for storing electric energy for exchange of electric energy with said first and second electric machines.

7. A method according to claim 6, wherein a distribution of torque to be delivered by the combustion engine and the second electric machine is selected so that the combustion engine will deliver a positive torque during the entire gear shifting procedure and said torque distribution is selected for controlling a delivery of electric power to said means for storing electric energy during the gear shifting procedure.

8. A method according to claim 1, wherein the further comprises a second locking means transferable between a locking position in which the output shaft of the combustion engine is locked to the rotor of the second electric machine and said first component of said three components of the planetary gearing and a releasing position in which the output shaft of the combustion engine is released from the rotor of the second electric machine and said first component of said three components of the planetary gearing and allowed to rotate independently thereof.

9. A method according to claim 1, wherein the sun gear of the planetary gearing is said first component of said three components of the planetary gearing and the ring gear is said third component of said three components of the planetary gearing.

10. A computer program product comprising a program code stored on a non-transitory data storage computer readable medium for controlling a vehicle with a drive system, where the drive system comprises a power assembly configuration configured to provide power for the propulsion of the vehicle, a planetary gearing comprising three components in the form of a sun gear, a ring gear and a planetary gears carrier, an input shaft of the planetary gearing being connected to a first component of said three components of the planetary gearing so that a rotation of the input shaft of the planetary gearing results in a rotation of the first component, an output shaft of the planetary gearing constituting an input shaft of a gearbox for transmitting a torque for propulsion of the vehicle being connected to a second of said three components of the planetary gearing so that a rotation of the output shaft of the planetary gearing results in a rotation of the second component, said power assembly configuration comprises a first electric machine with a first electric machine stator and a first electric machine rotor connected to a third of said three components of the planetary gearing so that rotation of the rotor of the first electric machine results in a rotation of the third component and a combustion engine having an output shaft connected to said input shaft of the planetary gearing, said drive system further comprising a first locking means transferable between a locking position in which two of said three components of the planetary gearing are interlocked so that said three components of the planetary gearing rotate with the same rotation speed and a releasing position in which said two of said three components of the planetary gearing are allowed to rotate with different rotation speeds, said power assembly configuration further comprises a second electric machine with a second electric machine stator and a second electric machine rotor connected to the input shaft of the planetary gearing, wherein said computer program code comprising computer instructions to cause one or more computer processors to perform the following operations for carrying out shifting from a present gear to a new gear in the gearbox when driving the vehicle with said first locking means in said locking position:

a) controlling the power assembly configuration to decrease the torque applied on said input shaft of the gearbox to decrease towards zero and to obtain torque balance in the planetary gearing;

b) upon obtaining torque balance in the planetary gearing, transferring said first locking means to said releasing position and starting to control members of the power assembly configuration acting upon said first component of said three components of the planetary gearing towards a target rotation speed of said new gear to be shifted to;

c) disengaging said present gear of the gearbox when the torque on said input shaft of the gearbox reaches zero and starting to control said power assembly configuration to apply a torque to said input shaft of the gearbox being negative when said new gear is higher than said present gear and positive when said new gear is lower than said present gear for controlling the rotation speed of said input shaft of the gearbox towards said target rotation speed of said new gear;

d) when the rotation speed of said input shaft of the gearbox reaches said target rotation speed, engaging said new gear, controlling the power assembly configuration to increase the torque on said input shaft of the gearbox while maintaining torque balance in the planetary gearing and continuing to control members of the power assembly configuration acting upon said first component of said three components of the planetary gearing towards said target rotation speed; and e) upon obtaining said target rotation speed of the input shaft of the planetary gearing transferring said first locking means to the locking position and continuing to control the power assembly configuration to increase the torque applied on said input shaft of the gearbox while controlling the different members of the power assembly configuration to deliver torques of desired values.

11. An electronic control unit of a motor vehicle comprising an execution means, a memory connected to the execution means and a non-transitory data storage medium which is connected to the execution means and on which a computer program code of a computer program is stored said computer program code for controlling a vehicle with a drive system, where the drive system comprises a power assembly configuration configured to provide power for the propulsion of the vehicle, a planetary gearing comprising three components in the form of a sun gear, a ring gear and a planetary gears carrier, an input shaft of the planetary gearing being connected to a first component of said three components of the planetary gearing so that a rotation of the input shaft of the planetary gearing results in a rotation of the first component, an output shaft of the planetary gearing constituting an input shaft of a gearbox for transmitting a torque for propulsion of the vehicle being connected to a second of said three components of the planetary gearing so that a rotation of the output shaft of the planetary gearing results in a rotation of the second component, said power assembly configuration comprises a first electric machine with a first electric machine stator and a first electric machine rotor connected to a third of said three components of the planetary gearing so that rotation of the rotor of the first electric machine results in a rotation of the third component and a combustion engine having an output shaft connected to said input shaft of the planetary gearing, said drive system further comprising a first locking means transferable between a locking position in which two of said three components of the planetary gearing are interlocked so that said three components of the planetary gearing rotate with the same rotation speed and a releasing position in which said two of said three components of the planetary gearing are allowed to rotate with different rotation speeds, said power assembly configuration further comprises a second electric machine with a second electric machine stator and a second electric machine rotor connected to the input shaft of the planetary gearing, wherein said computer program code comprising computer instructions to cause one or more computer processors to perform the following operations for carrying out shifting from a present gear to a new gear in the gearbox when driving the vehicle with said first locking means in said locking position:

a) controlling the power assembly configuration to decrease the torque applied on said input shaft of the gearbox to decrease towards zero and to obtain torque balance in the planetary gearing;

b) upon obtaining torque balance in the planetary gearing, transferring said first locking means to said releasing position and starting to control members of the power assembly configuration acting upon said first component of said three components of the planetary gearing towards a target rotation speed of said new gear to be shifted to;

c) disengaging said present gear of the gearbox when the torque on said input shaft of the gearbox reaches zero and starting to control said power assembly configuration to apply a torque to said input shaft of the gearbox being negative when said new gear is higher than said present gear and positive when said new gear is lower than said present gear for controlling the rotation speed of said input shaft of the gearbox towards said target rotation speed of said new gear;

d) when the rotation speed of said input shaft of the gearbox reaches said target rotation speed, engaging said new gear, controlling the power assembly configuration to increase the torque on said input shaft of the gearbox while maintaining torque balance in the planetary gearing and continuing to control members of the power assembly configuration acting upon said first component of said three components of the planetary gearing towards said target rotation speed; and e) upon obtaining said target rotation speed of the input shaft of the planetary gearing transferring said first locking means to the locking position and continuing to control the power assembly configuration to increase the torque applied on said input shaft of the gearbox while controlling the different members of the power assembly configuration to deliver torques of desired values.

* * * * *

UNITED STATES PATENT AND TRADEMARK OFFICE
CERTIFICATE OF CORRECTION

PATENT NO. : 10,619,730 B2  
APPLICATION NO. : 15/735072  
DATED : April 14, 2020  
INVENTOR(S) : Johan Lindström et al.

Page 1 of 1

It is certified that error appears in the above-identified patent and that said Letters Patent is hereby corrected as shown below:

In the Claims

In Column 11, Claim 8, Line 5:
Please add the word "vehicle" so that Lines 5-6 read as follows: "8. A method according to claim 1, wherein the vehicle further comprises a second locking means transferable between a..."

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*